US008808830B2

(12) United States Patent
Preisler et al.

(10) Patent No.: US 8,808,830 B2
(45) Date of Patent: *Aug. 19, 2014

(54) SANDWICH-TYPE, STRUCTURAL, COMPOSITE COMPONENT HAVING A CUT-OUT FEATURE WITH A SUBSTANTIALLY HIDDEN CORE, ASSEMBLY UTILIZING SAME AND PANEL FOR USE IN A VEHICLE LOAD FLOOR ASSEMBLY

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/689,809

(22) Filed: Nov. 30, 2012

(65) Prior Publication Data
US 2013/0280473 A1  Oct. 24, 2013

Related U.S. Application Data

(63) Continuation-in-part of application No. 13/688,972, filed on Nov. 29, 2012, and a continuation-in-part of application No. 13/453,269, filed on Apr. 23, 2012.

(51) Int. Cl.
| | |
|---|---|
| *B60R 5/00* | (2006.01) |
| *B32B 3/12* | (2006.01) |
| *A47G 27/02* | (2006.01) |
| *B60R 13/01* | (2006.01) |
| *B32B 3/26* | (2006.01) |
| *B60R 5/04* | (2006.01) |

(52) U.S. Cl.
CPC . *B32B 3/263* (2013.01); *B32B 3/12* (2013.01); *B60R 5/04* (2013.01); *A47G 27/02* (2013.01); *B60R 13/011* (2013.01)

USPC .......... 428/99; 296/39.1; 296/39.2; 296/39.3; 296/97.23; 428/95; 428/98

(58) Field of Classification Search
CPC .......... A47G 27/02; B29C 43/00; B32B 3/02; B32B 3/04; B32B 3/12; B32B 3/263; B60R 5/00; B60R 5/04; B60R 13/00; B60R 13/011; B62D 25/20
USPC .............. 428/95, 98, 99, 116; 296/39.1, 39.2, 296/39.3, 97.23
See application file for complete search history.

(56) References Cited

U.S. PATENT DOCUMENTS

| | | | |
|---|---|---|---|
| 5,502,930 | A | 4/1996 | Burkette et al. |
| 5,915,445 | A | 6/1999 | Rauenbusch |

(Continued)

OTHER PUBLICATIONS

Office Action; corresponding U.S. Appl. No. 13/688,972; date of mailing Mar. 28, 2014.

(Continued)

*Primary Examiner* — Brent O'Hern
(74) *Attorney, Agent, or Firm* — Brooks Kushman P.C.

(57) ABSTRACT

A sandwich-type, structural, composite component having a cut-out feature with a substantially hidden core, assembly utilizing same and panel for use in a vehicle load floor assembly are disclosed. The component includes a first outer layer, a second outer layer and a core positioned between the outer layers and having a large number of cavities. The outer layers are bonded to the core by press molding. An interior portion of the component enclosed by the rest of the component is locally crushed by the press molding to form at least one depression. A cut-out extends completely through the component at the interior portion of the component. Side surfaces of the at least one depression substantially hide the core at the cut-out without compromising the structural integrity of the component.

20 Claims, 4 Drawing Sheets

(56) References Cited

U.S. PATENT DOCUMENTS

| | | | |
|---|---|---|---|
| 6,050,630 A | 4/2000 | Hochet | |
| 6,102,464 A | 8/2000 | Schneider et al. | |
| 6,435,577 B1 | 8/2002 | Renault | |
| 6,537,413 B1 | 3/2003 | Hochet et al. | |
| 6,655,299 B2 | 12/2003 | Preisler et al. | |
| 6,682,675 B1 | 1/2004 | Vandangeot et al. | |
| 6,682,676 B1 | 1/2004 | Renault et al. | |
| 6,748,876 B2 | 6/2004 | Preisler et al. | |
| 6,790,026 B2 | 9/2004 | Vandangeot et al. | |
| 6,823,803 B2 | 11/2004 | Preisler | |
| 6,843,525 B2 | 1/2005 | Preisler | |
| 6,890,023 B2 | 5/2005 | Preisler et al. | |
| 6,981,863 B2 | 1/2006 | Renault et al. | |
| 7,090,274 B1 | 8/2006 | Khan et al. | |
| 7,419,713 B2 | 9/2008 | Wilkens et al. | |
| 7,909,379 B2 | 3/2011 | Winget et al. | |
| 7,919,031 B2 | 4/2011 | Winget et al. | |
| 8,117,972 B2 | 2/2012 | Winget et al. | |
| 8,622,456 B2 | 1/2014 | Preisler et al. | |
| 8,690,233 B2 | 4/2014 | Preisler et al. | |
| 2003/0079659 A1* | 5/2003 | Preisler et al. | 108/51.3 |
| 2005/0189674 A1 | 9/2005 | Hochet et al. | |
| 2006/0255611 A1 | 11/2006 | Smith et al. | |
| 2008/0185866 A1 | 8/2008 | Tarrant et al. | |
| 2010/0026031 A1 | 2/2010 | Jouraku | |
| 2013/0278002 A1 | 10/2013 | Preisler et al. | |
| 2013/0278003 A1* | 10/2013 | Preisler et al. | 296/37.5 |
| 2013/0278009 A1 | 10/2013 | Preisler et al. | |
| 2013/0278015 A1 | 10/2013 | Preisler et al. | |
| 2013/0278018 A1 | 10/2013 | Preisler et al. | |
| 2013/0278019 A1 | 10/2013 | Preisler et al. | |
| 2013/0278020 A1 | 10/2013 | Preisler et al. | |
| 2013/0280469 A1 | 10/2013 | Preisler et al. | |
| 2013/0280472 A1 | 10/2013 | Preisler et al. | |
| 2013/0280473 A1 | 10/2013 | Preisler et al. | |
| 2013/0312652 A1 | 11/2013 | Preisler et al. | |
| 2013/0316123 A1 | 11/2013 | Preisler et al. | |
| 2014/0077518 A1 | 3/2014 | Preisler et al. | |
| 2014/0077530 A1 | 3/2014 | Preisler et al. | |
| 2014/0077531 A1 | 3/2014 | Preisler et al. | |
| 2014/0145465 A1 | 5/2014 | Preisler et al. | |
| 2014/0145470 A1 | 5/2014 | Preisler et al. | |
| 2014/0147617 A1 | 5/2014 | Preisler et al. | |
| 2014/0147622 A1 | 5/2014 | Preisler et al. | |

OTHER PUBLICATIONS

Office Action; related U.S. Appl. No. 13/479,974; date of mailing Mar. 20, 2014.
Office Action; related U.S. Appl. No. 13/686,362; date of mailing Mar. 25, 2014.
Office Action; related U.S. Appl. No. 13/523,253; date of mailing Mar. 25, 2014.
Office Action; related U.S. Appl. No. 13/688,972; date of mailing Mar. 28, 2014.
Office Action; related U.S. Appl. No. 13/687,232; date of mailing Mar. 28, 2014.
Office Action; related U.S. Appl. No. 13/689,809; date of mailing Mar. 31, 2014.
Office Action; related U.S. Appl. No. 13/687,213; date of mailing Mar. 31, 2014.
Office Action; related U.S. Appl. No. 13/690,265; date of mailing Mar. 31, 2014.
Office Action; related U.S. Appl. No. 13/762,904; date of mailing Apr. 8, 2014.
Office Action; related U.S. Appl. No. 13/762,800; date of mailing Apr. 8, 2014.
Office Action; related U.S. Appl. No. 13/762,861; date of mailing Apr. 9, 2014.
Office Action; related U.S. Appl. No. 13/690,566; date of mailing Apr. 9, 2014.
Office Action; related U.S. Appl. No. 13/762,832; date of mailing Apr. 11, 2014.
Office Action; related U.S. Appl. No. 13/762,921; date of mailing Apr. 14, 2014.
Notice of Allowance; related U.S. Appl. No. 13/686,388; date of mailing Apr. 15, 2014.
Related U.S. Appl. No. 13/690,566, filed Nov. 30, 2012.
Related U.S. Appl. No. 13/762,921, filed Feb. 8, 2013.
Related U.S. Appl. No. 13/762,956, filed Feb. 8, 2013.
Office Action; related U.S. Appl. No. 13/453,201 (now USPN 8,690,233); date of mailing Nov. 20, 2013.
Office Action; related U.S. Appl. No. 13/523,209 (now USPN 8,622,456) date of mailing Apr. 29, 2013.

* cited by examiner

SANDWICH-TYPE, STRUCTURAL, COMPOSITE COMPONENT HAVING A CUT-OUT FEATURE WITH A SUBSTANTIALLY HIDDEN CORE, ASSEMBLY UTILIZING SAME AND PANEL FOR USE IN A VEHICLE LOAD FLOOR ASSEMBLY

CROSS-REFERENCE TO RELATED APPLICATIONS

This application is a continuation-in-part of both U.S. patent applications entitled "Assembly Including a Compression-Molded Composite Component Having a Sandwich Structure and a Unitarily Connected Second Component" having U.S. Ser. No. 13/688,972, filed Nov. 29, 2012 and U.S. patent application entitled "Method of Making a Sandwich-Type Composite Panel Having a Living Hinge and Panel Obtained by Performing the Method" filed Apr. 23, 2012 and having U.S. Ser. No. 13/453,269, both of which are incorporated by reference herein in their entirety.

TECHNICAL FIELD

At least one embodiment of the invention relates to a sandwich-type, structural, composite component having a cut-out feature with a substantially hidden core, assembly utilizing same and panel for use in a vehicle load floor assembly.

OVERVIEW

Some compression-molded composites combine a lightweight, low-density core with fiber-reinforced thermoplastic skins or outer layers thereby resulting in a sandwich structure. The resulting composite component has a high stiffness-to-weight ratio thereby making it desirable for use in a wide variety of applications including load-bearing applications. In general, the thicker the core, the higher the load bearing capacity of the composite component.

As a result of their high stiffness-to-weight ratio and load-bearing capacity, such compression-molded composites have been used as load floors in automotive applications and as skis or snowboards (i.e., sliding boards) in recreational applications.

One problem associated with such composites is that their function and design freedom is limited by their designed material thickness.

It is often highly desirable to secure hardware and other components to composite components. In automotive applications, such as rear load-bearing load floors, it is desirable to provide attachment mechanisms at various locations to secure cargo to protect the cargo from sliding, rolling, etc. which tends to damage the cargo as well as other items or structures in the cargo area.

Because of the large forces that cargo as well as individuals can exert on the load floor, any attachment or fastening mechanism must be able to withstand not only large pull-out forces but also large push-in forces. Also, such attachment or fastening mechanisms must be able to withstand large torque forces to prevent the mechanisms from being "torqued out" of or "torqued into" the composite components.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,793,747; 6,748,876; 6,790,026; 6,682,676; 6,823,803; 6,843,525; 6,890,023; 6,981,863; 7,014,259; 7,090,274; 7,093,879; 7,264,685; 7,320,739; 7,402,537; 7,419,713; 7,419,713; 7,837,009; 7,909,379; 7,918,313; 7,919,031; 8,117,972; 2005/0189674; 2006/0255611; 2008/0185866 and 2011/0315310.

One problem associated with prior art sandwich-type, structural composite components is that if a cut-out feature is desired or required, a core of the component is exposed. When exposed, the core can become damaged which may not only compromise the structural integrity of the component but also detracts from the appearance of the component.

SUMMARY OF EXAMPLE EMBODIMENTS

An object of at least one embodiment of the present invention is to provide a sandwich-type, structural, composite component having a cut-out feature without compromising the structural integrity of the component, without increasing the thickness, quality or exposure of the core and without adding one or more strengthening components which would add cost and/or weight.

In carrying out the above object and other objects of at least one embodiment of the present invention, a sandwich-type, structural, composite component having a cut-out feature is provided. The component includes a first outer layer, a second outer layer and a core positioned between the outer layers and having a large number of cavities. The outer layers are bonded to the core by press molding. An interior portion of the component enclosed by the rest of the component is locally crushed by the press molding to form at least one depression. Each depression has bottom and side surfaces. The component also includes a cut-out which extends completely through the component at the interior portion of the component. The side surfaces of the at least one depression substantially hide the core at the cut-out without compromising the structural integrity of the component.

The interior portion of the component may be completely enclosed by the rest of the component. The component may further include a substantially continuous carpet layer bonded to an upper surface of the first outer layer to form a carpeted component. The cut-out may extend completely through the carpet layer.

Further in carrying out the above object and other objects of at least one embodiment of the present invention, an assembly including a first component is provided. The first component includes a first outer layer, a second outer layer, and a core positioned between the outer layers and having a large number of cavities. The outer layers are bonded to the core by press molding. An interior portion of the component enclosed by the rest of the component is locally crushed by the press molding to form at least one depression. Each depression has bottom and side surfaces. The component also includes a cut-out which extends completely through the component at the interior portion of the component. The side surfaces of the at least one depression substantially hide the core at the cut-out without compromising the structural integrity of the component. The assembly also includes a second component assembled together with the first component at the cut-out to form the assembly.

The assembly may include a fastener disposed in the cut-out to fasten the components together.

The fastener may be a threaded fastener which extends completely through the first component.

The fastener may be externally threaded, wherein the fastener extends completely through the cut-out to fasten the first and second components together.

The assembly may include a substantially continuous carpet layer bonded to an upper surface of the first outer layer to form a carpeted composite component. The second component may be assembled with the first component at a lower surface of the second outer layer.

The first outer layer may be made out of a polymeric material.

A portion of the second component may be received in the at least one depression.

The assembly may include a substantially continuous carpet layer bonded to an upper surface of the second component to form a carpeted assembly. The second component may be assembled with the first component at an upper, load-bearing surface of the first outer layer of the first component.

The first outer layer maybe a fiber-reinforced, thermoplastic layer.

The carpet layer may be a thermoplastic carpet layer wherein the thermoplastic of the first outer layer and the carpet layer is polypropylene.

The composite first component may have a thickness in the range of 5 to 25 mm.

The outer layers may be fiber-reinforced layers wherein the first outer layer has a load bearing surface.

The core may be a cellular core and/or have a honeycomb structure.

The interior portion of the first component may be completely enclosed by the rest of the first component.

Still further in carrying out the above object and other objects of at least one embodiment of the present invention a sandwich-type, structural, composite panel having a cut-out feature for use in a vehicle load floor assembly is provided. The panel includes a first outer layer, a second outer layer, and a core positioned between the outer layers and have a large number of cavities. The outer layers are bonded to the core by press molding. An interior portion of the panel enclosed by the rest of the panel is locally crushed by the press molding to form at least one depression. Each depression has bottom and side surfaces. The panel also includes a cut-out which extends completely through the panel at the interior portion of the panel. The side surfaces of the at least one depression substantially hide the core at the cut-out without compromising the structural integrity of the panel.

The interior portion of the panel may be completely enclosed by the rest of the panel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
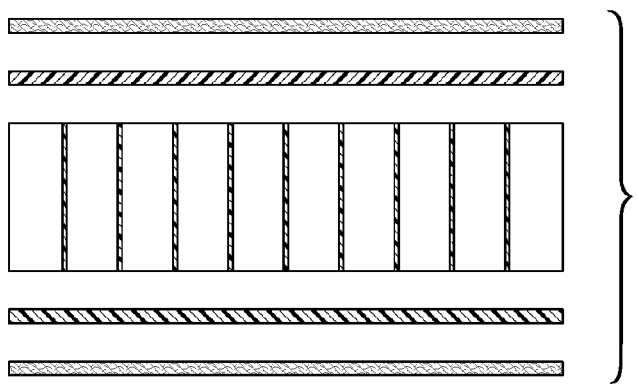
FIG. 1 is a side sectional view showing various separate layers of a prior art stack of thermoplastic-based layers of material.
Figure 2:
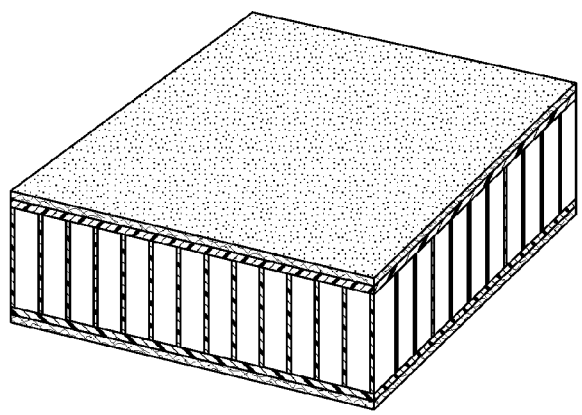
FIG. 2 is a top perspective sectional view of the stack of FIG. 1 after compression molding.
Figure 3:
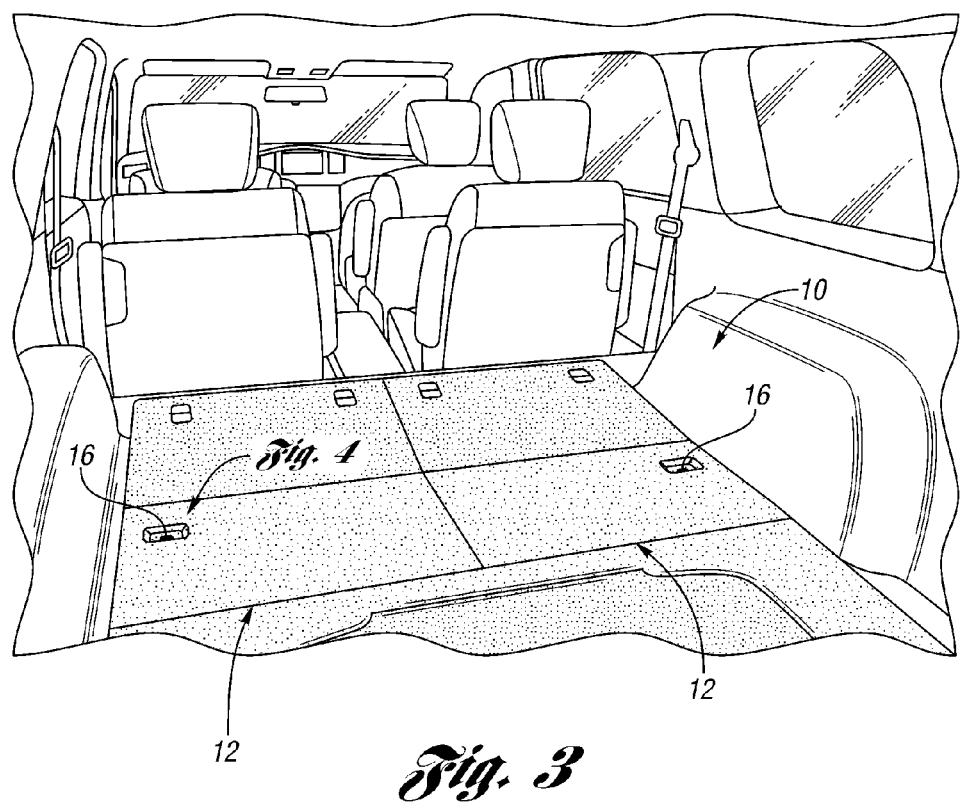
FIG. 3 is an environmental view, partially broken away, of a carpeted automotive vehicle load floor including a pair of carpeted, sandwich-type, compression-molded, composite hinged panels each being constructed in accordance with at least one embodiment of the present invention.

Referring now to FIG. 3, a vehicle floor panel assembly such as a load floor assembly, generally included at 10, is positioned or supported at the rear of an automotive vehicle. The assembly 10 includes one or more hinged compression-molded composite panels or components, generally indicated at 12, each having a composite structure and at least one of the components 12 having a cut-out or cut-out feature 16 which allows the passage of parts, for example, through the component 12 at a depression formed in the component 12.

Each of the panels 12 may have a living hinge. The hinged panels 12 are shown in FIG. 3 as forming separate parts of the automotive vehicle load floor 10. However, it is to be understood that one or more panels 12 constructed in accordance with at least one embodiment of the present invention may be used in a wide variety of environments. The panels 12 in FIG.

Figure 4:
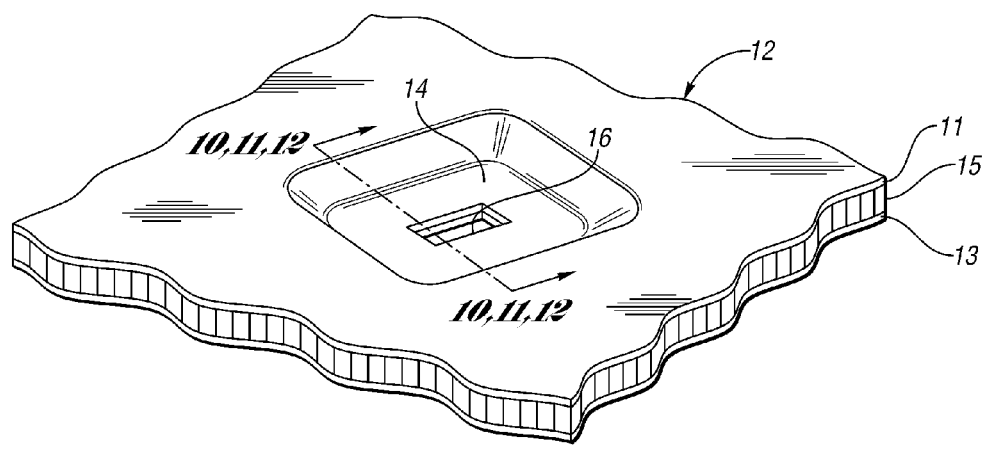
FIG. 4 is an enlarged view, partially broken away, of a portion of one of the panels or components of FIG. 3 (without a carpet layer) to illustrate a cut-out feature with a core substantially hidden by the side surfaces of a depression compression or press molded into the component.
Figure 5:
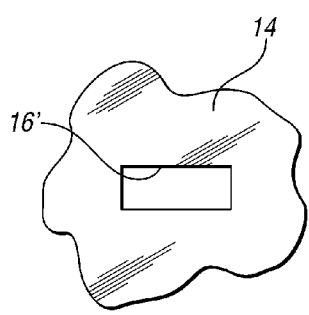
FIGS. 5-9 are top plan views of various possible cut-out features formed or cut through a bottom surface of the depression of FIG. 4.
Figure 6:
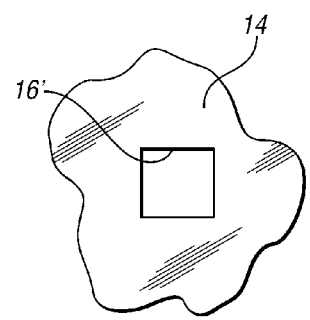
Figure 7:
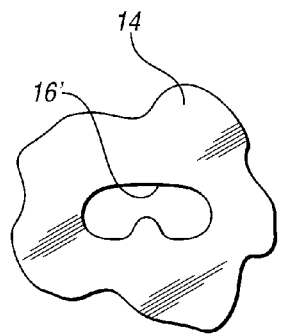
Figure 8:
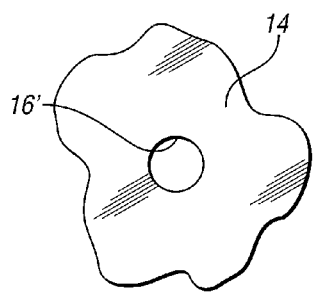
Figure 9:
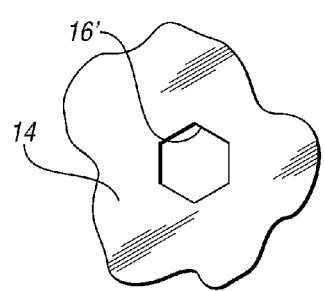

3 are shown carpeted but at least one embodiment of the invention does not require such carpeting such as in FIG. 4.

Figure 10:
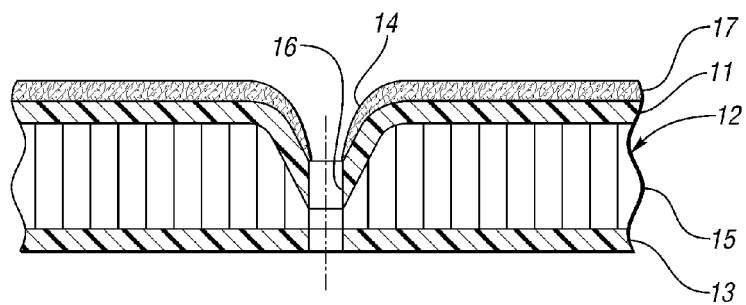
FIG. 10 is a view, partially broken away and in cross section, taken along lines 10-10 of FIG. 4 and showing a component or panel of at least one embodiment of the present invention prior to assembling one or more other components thereto to form an assembly.

Referring now to FIG. 4, a method of making the panels 12 may include providing a stack of material, located or positioned within a mold. The stack includes first and second reinforced thermoplastic layers or skins 11 and 13, respectively, a thermoplastic cellular core 15 disposed between the skins 11 and 13 and a covering or carpet layer 17 of thermoplastics material which covers the first skin 11 (FIGS. 10 and 12). The skins 11 and 13 are heated typically outside of the mold to a softening temperature. The mold is preferably a low pressure compression mold which performs a thermo compression process on the stack of material. The mold typically has an upper mold half or part and a lower mold half or part. The upper mold part typically has a protrusion extending towards the lower mold half for crushing purposes in forming an upper depression (FIGS. 10, 11 and 12) as described in detail below. The lower mold half may also have a protrusion which extends towards the upper mold part for crushing purposes in forming a lower depression (FIG. 12).

The first and second skins 11 and 13, respectively, are stretchable when heated to the softening temperature and stretch when a pressure is applied to the stack by the inner mold surfaces of the mold halves of the mold including the outer surface of the protrusions within the mold to form the composite panel 12, 12' or 12" with an upper surface depression 14 (FIGS. 10-12) and a lower surface depression 19 (FIG. 12). One or more portions of the composite panel 12, 12' or 12" are crushed at a predetermined location simultaneously with the step of applying the pressure to locally compact (FIGS. 10, 11 and 12) and separate (FIGS. 11 and 12) the cellular core 15 at the predetermined location to form two side portions of the panel 12, 12' or 12" and the crushed portion (at depressions 14 and 17) therebetween. The first skin 11 may typically stretch during the step of crushing while remaining intact between the two side portions of the panel 12, 12' or 12". The first and second skins 11 and 13, respectively, of the crushed portion may be chemically bonded together (FIGS. 11 and 12) to form the depressions 14 and 19 at the predetermined location between the two side portions of the panels 12' and 12". As shown in FIG. 10, the first and second skins 11 and 13 are not chemically bonded together but rather are chemically bonded to the core 15.

As previously mentioned, the stack of material may also preferably include the thermoplastic covering layer 17 for covering the first skin 11 (FIGS. 10 and 12) when making a carpeted panel such as the carpeted panels 12 and 12" of FIGS. 10 and 12, respectively. While not shown, the stack may also include a second thermoplastic covering layer for at least partially covering the second skin 13 so that a portion of the resulting panel 12 is carpeted on its top and bottom surfaces.

The covering layer 17 may be a resin carpet and the resin may be polypropylene. One side or both sides of a portion of the panel 12 may be covered with an outer covering layer made of a woven or non-woven material (typically of the carpet type).

The cellular core 15 may be a honeycomb core. In this example, the cellular core 15 is an open-celled structure of the type made up of tubes or of a honeycomb, and it is made mainly of polyolefin and preferably of polypropylene. It is also possible to use a cellular structure having closed cells of the foam type.

Each of the skins 11 and 13 may be fiber reinforced. The thermoplastic of the skins 11 and 13, one or more covering layers 17 and the core 15 may be polypropylene. At least one of the skins 11 and 13 may be a woven skin, such as polypropylene skin. The first and second skins 11 and 13 may be reinforced with fibers, e.g., glass fibers, carbon fibers or natural fibers. The first and second skins 11 and 13 may advantageously be made up of woven glass fiber fabric and of a thermoplastics material.

The resulting panels 12 (FIG. 10), 12' (FIG. 11) and 12" (FIG. 12) may have a thickness in the range of 5 to 25 mm and the crushed portion of the panel 12, 12' or 12" may have a thickness less than 4 mm such as 2 mm or less.

In one example method of making such a panel, the panel 12, 12' or 12" is formed by pressing a stack of material in the low-pressure, cold-forming mold, the stack being made up of the first skin 11, the cellular core 15 and the second skin 17. The stack may be pressed at a pressure lying in the range $10 \times 10^5$ Pa. to $30 \times 10^5$ Pa. The first and second skins 11 and 13 are preferably pre-heated in the method to make them malleable and stretchable. Advantageously, in order to soften the first and second skins 11 and 13, heat is applied to a pre-assembly constituted by the stack made up of at least the first skin 11, of the cellular core 13, and of the second skin 13 so that, while the panel 12, 12' or 12" is being formed in the mold, the first and second skins 11 and 13 have a forming temperature lying approximately in the range of 160° C. to 200° C., and, in this example, about 180° C.

The protrusion or protrusions of the mold may have other shapes in cross section in order for the mold to perform the crushing step during the pressure application step.

After the crushing step, a cut-out or cut-out feature 16 or 16' is formed such as by cutting completely through the panels 12, 12' and 12" and a lower surface of the depression 14 and/or depression 19. The cut-out 16 or 16' may be of any size or shape as shown in FIGS. 5-9 and extends completely through the component 12, 12' or 12" at an interior portion of the component 12, 12' or 12" wherein the side surfaces of the at least one depression 14 and/or 19 substantially hide the core 15 at the cut-out 16 or 16' without compromising the structural integrity of the component 12, 12' or 12".

As shown in FIGS. 3 and 4, the crushed interior portion may be completely enclosed by the rest of the component 12, 12' or 12". However, it is to be understood that the crushed component need not be completely enclosed by the rest of the panel 12, 12' or 12".

Figure 11:
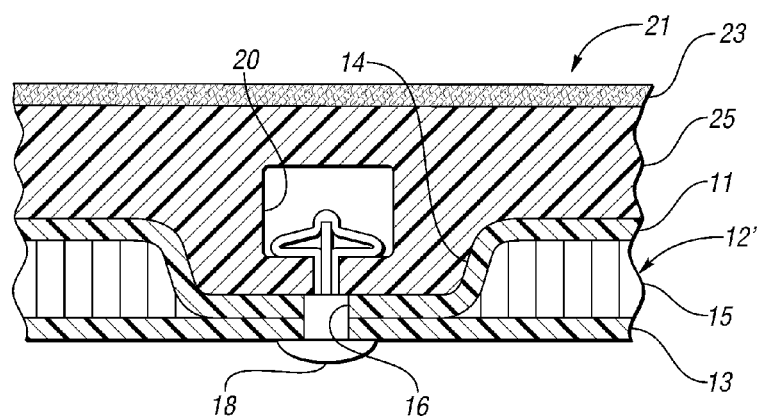
FIG. 11 is a view, similar to the view of FIG. 10, taken along lines 11-11 of FIG. 4, but showing a different component or panel of at least one embodiment of the present invention after the assembling a second component thereto.
Figure 12:
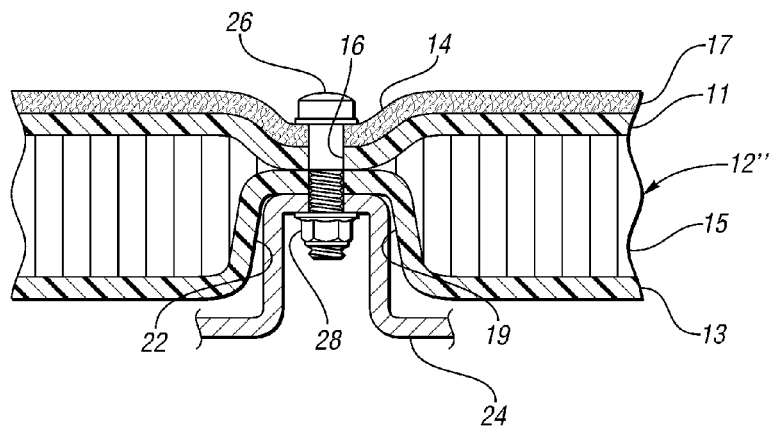
FIG. 12 is a view, similar to the views of FIGS. 10 and 11, taken along lines 12-12 of FIG. 4 but showing yet another different component of at least one embodiment of the present invention after the assembling of still another second component thereto.

In forming an assembly of components including the component 12, 12' or 12" at least one other component such as a carpeted plastic component generally indicated at 21 in FIG. 11, or a metal bracket 24 (FIG. 12) may be assembled with the component 12' (FIG. 11) and the component 12" (FIG. 12) utilizing the cut-out 16. In FIG. 11, the component 21 includes a substantially continuous carpet layer 23 which is bonded to the upper surface of a hollow plastic part 25. An aperture 20 in the lower surface of the part 25 allows a fastener such as a resilient plastic retaining connector 18 to secure a connection between the components 12' and 21.

In FIG. 12 a fastener or connector, such as an externally threaded bolt 26 extends completely through the cut-out 16 between the top surface of the carpet 17 and a lower surface of the bracket 24. A head of the bolt 26 is located in the depression 14. A washer and a nut 28 secure the connection between the component 12" and the bracket 24. The bracket 24 may extend across the width of the storage area under the panel 12" to support the panel 12".

The fastener may be any of various devices for fastening the first component to the second component such as the externally threaded screw or bolt 26. The bolt 26 is characterized by a helical ridge or external thread, wrapped around a cylinder. The screw threads typically mate with a complementary thread or internal thread. The internal thread may be in the form of the nut 28 or an object that has the internal thread formed into it. The bolt thread may also cut a helical groove in the softer material of the component 24 as the screw or bolt 26 is inserted. The head of the bolt 26 is preferably decorative.

Each screw or bolt 26 may be made from a wide range of materials, with steel being perhaps the most preferred, in many varieties. Where great resistance to corrosion is required, stainless steel, titanium, brass, bronze, monel or silicon bronze may be used. Galvanic corrosion of dissimilar metals can be prevented by a careful choice of material.

Some types of plastic, such as nylon or polytetrafluoroethylene (PTFE), can be threaded and used for fastenings requiring moderate strength and great resistance to corrosion or for the purpose of electrical insulation. A surface coating may be used to protect the fastener from corrosion (e.g. bright zinc plating for steel screws), to impart a decorative finish (e.g. jappaning) or otherwise alter the properties of the base material. Selection criteria of the screw materials include temperature, required strength, resistance to corrosion, joint material and cost.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A sandwich-type, structural, composite component having a cut-out feature, the component comprising:
    a first outer layer;
    a second outer layer;
    a core positioned between the first outer layer and the second outer layer and having a plurality of cavities wherein the outer layers are bonded to the core by press molding, and wherein an interior portion of the component is locally crushed by the press molding to form at least one depression, each depression having bottom and side surfaces; and
    a cut-out which extends completely through the component at the interior portion of the component wherein the side surfaces of the at least one depression substantially hide the core at the cut-out without compromising the structural integrity of the component.

2. The component as claimed in claim 1, wherein the interior portion of the component is completely enclosed by the rest of the component.

3. The component as claimed in claim 1, further comprising a substantially continuous carpet layer bonded to an upper surface of the first outer layer, the cut-out extending completely through the carpet layer to form a carpeted component.

4. An assembly comprising:
    a sandwich-type, structural, composite component having a cut-out feature, the component including:
    a first outer layer;
    a second outer layer;
    a core positioned between the first outer layer and the second outer layer and having a plurality of cavities wherein the outer layers are bonded to the core by press molding, and wherein an interior portion of the component is locally crushed by the press molding to form at least one depression, each depression having bottom and side surfaces; and
    a cut-out which extends completely through the component at the interior portion of the component wherein the side surfaces of the at least one depression substantially hide the core at the cut-out without compromising the structural integrity of the component; and
    a second component assembled together with the first component at the cut-out to form the assembly.

5. The assembly as claimed in claim 4, further comprising a fastener disposed in the cut-out to fasten the components together.

6. The assembly as claimed in claim 5, wherein the fastener is a threaded fastener which extends completely through the first component.

7. The assembly as claimed in claim 6, wherein the fastener is externally threaded and wherein the fastener extends completely through the cut-out to fasten the first and second components together.

8. The assembly as claimed in claim 4, further comprising a substantially continuous carpet layer bonded to an upper surface of the first outer layer to form a carpeted composite component, the second component being assembled with the first component at a lower surface of the second outer layer.

9. The assembly as described in claim 4, wherein the first outer layer is made out of a polymeric material.

10. The assembly as claimed in claim 4, wherein a portion of the second component is received in the at least one depression.

11. The assembly as claimed in claim 4, further comprising a substantially continuous carpet layer bonded to an upper surface of the second component wherein the second component is assembled with the first component at an upper, load-bearing surface of the first outer layer of the first component to form a carpeted assembly.

12. The assembly as claimed in claim 8, wherein the first outer layer is a fiber-reinforced, thermoplastic layer.

13. The assembly as claimed in claim 12, wherein the carpet layer is a thermoplastic carpet layer and wherein the thermoplastic of the first outer layer and the carpet layer is polypropylene.

14. The assembly as claimed in claim 4, wherein the composite first component has a thickness in the range of 5 to 25 mm.

15. The assembly as claimed in claim 4, wherein the first and second outer layers are fiber-reinforced layers and wherein the first outer layer has a load bearing surface.

16. The assembly as claimed in claim 4, wherein the core is a cellular core.

17. The assembly as claimed in claim 4, wherein the core has a honeycomb structure.

18. The assembly as claimed in claim 4, wherein the interior portion of the first component is completely enclosed by the rest of the first component.

19. A sandwich-type, structural, composite panel having a cut-out feature for use in a vehicle load floor assembly, the panel comprising:
    a first outer layer;
    a second outer layer;
    a core positioned between the outer layers and having a plurality of cavities wherein the outer layers are bonded to the core by press molding, and wherein an interior portion of the panel is locally crushed by the press molding to form at least one depression, each depression having bottom and side surfaces; and
    a cut-out which extends completely through the panel at the interior portion of the panel wherein the side surfaces of the at least one depression substantially hide the core at the cut-out without compromising the structural integrity of the panel.

20. The panel as claimed in claim 19, wherein the interior portion of the panel is completely enclosed by the rest of the panel.

* * * * *